United States Patent [19]
Johnson

[11] 4,181,968
[45] Jan. 1, 1980

[54] METHOD AND APPARATUS FOR FORMING CONVOLUTIONS OF TWO COMPLEX NUMBER SEQUENCES USING THE FERMAT NUMBER TRANSFORM

[75] Inventor: Richard N. Johnson, Adelphi, Md.

[73] Assignee: The United States of America as represented by the Secretary of the Army, Washington, D.C.

[21] Appl. No.: 915,418

[22] Filed: Jun. 14, 1978

[51] Int. Cl.² ............................................. G06F 15/34
[52] U.S. Cl. .................................. 364/728; 364/725; 364/746
[58] Field of Search ............... 364/728, 725, 746, 724, 364/754

[56] References Cited

U.S. PATENT DOCUMENTS

| | | | |
|---|---|---|---|
| 4,060,850 | 11/1977 | Speiser | 364/728 X |
| 4,093,994 | 6/1978 | Nussbaumer | 364/725 X |
| 4,107,783 | 8/1978 | Huang | 364/746 |

OTHER PUBLICATIONS

Agarwal et al., "Fast Convolution Using Fermat Number Transforms with Applications to Digital Filtering", IEEE Trans. on Acoustics, Speech & Signal Processing, Apr. 1974, pp. 87-97.

McClellan, "Hardware Realization of a Fermat Number Transform", IEEE Trans. on Acoustics, Speech, and Signal Processing, Jun. 1976, pp. 216-225.

Nussbaumer, "Digital Filtering Using Pseudo Fermat Transforms", IBM Tech. Disclosure Bulletin, vol. 19, No. 2, Jul. 1976, pp. 530-532.

Primary Examiner—David H. Malzahn
Attorney, Agent, or Firm—Nathan Edelberg; Robert P. Gibson; Saul Elbaum

[57] ABSTRACT

A digital computing method and apparatus for complex numbers which, more particularly, comprises a technique and hardware for forming the complex linear vector product of two transformed sequences. The invention is designed for use in a computer system wherein all arithmetic is performed modulo a number of the form $2^b+1$ and, in essence, consists of replacing complex numbers of the form $A+jB$ by numbers of the form $A\pm 2^{b/2}B$, after which products, sums and differences are computed to yield the desired result.

15 Claims, 7 Drawing Figures

| POWERS OF TWO | 0 | 1 | 2 | 3 | 4 | 5 | 6 | 7 | 12 |
|---|---|---|---|---|---|---|---|---|---|
| Q15 | 15 | | | | | | | | |
| $\overline{Q15}$ | | 0 | 1 | 2 | 3 | 4 | 5 | 6 | 11 |
| Q14 | 14 | 15 | | | | | | | |
| $\overline{Q14}$ | | | 0 | 1 | 2 | 3 | 4 | 5 | 10 |
| Q13 | 13 | 14 | 15 | | | | | | |
| $\overline{Q13}$ | | | | 0 | 1 | 2 | 3 | 4 | 9 |
| Q12 | 12 | 13 | 14 | 15 | | | | | |
| $\overline{Q12}$ | | | | | 0 | 1 | 2 | 3 | 8 |
| Q11 | 11 | 12 | 13 | 14 | 15 | | | | |
| $\overline{Q11}$ | | | | | | 0 | 1 | 2 | 7 |
| Q10 | 10 | 11 | 12 | 13 | 14 | 15 | | | |
| $\overline{Q10}$ | | | | | | | 0 | 1 | 6 |
| Q9 | 9 | 10 | 11 | 12 | 13 | 14 | 15 | | |
| $\overline{Q9}$ | | | | | | | | 0 | 5 |
| Q8 | 8 | 9 | 10 | 11 | 12 | 13 | 14 | 15 | |
| $\overline{Q8}$ | | | | | | | | | 4 |
| Q7 | 7 | 8 | 9 | 10 | 11 | 12 | 13 | 14 | |
| $\overline{Q7}$ | | | | | | | | | 3 |
| Q6 | 6 | 7 | 8 | 9 | 10 | 11 | 12 | 13 | |
| $\overline{Q6}$ | | | | | | | | | 2 |
| Q5 | 5 | 6 | 7 | 8 | 9 | 10 | 11 | 12 | |
| $\overline{Q5}$ | | | | | | | | | 1 |
| Q4 | 4 | 5 | 6 | 7 | 8 | 9 | 10 | 11 | |
| $\overline{Q4}$ | | | | | | | | | 0 |
| Q3 | 3 | 4 | 5 | 6 | 7 | 8 | 9 | 10 | 15 |
| $\overline{Q3}$ | | | | | | | | | |
| Q2 | 2 | 3 | 4 | 5 | 6 | 7 | 8 | 9 | 14 |
| $\overline{Q2}$ | | | | | | | | | |
| Q1 | 1 | 2 | 3 | 4 | 5 | 6 | 7 | 8 | 13 |
| $\overline{Q1}$ | | | | | | | | | |
| Q0 | 0 | 1 | 2 | 3 | 4 | 5 | 6 | 7 | 12 |
| $\overline{Q0}$ | | | | | | | | | |

HARD WIRED MULTIPLY CONNECTED SCHEDULE

METHOD AND APPARATUS FOR FORMING CONVOLUTIONS OF TWO COMPLEX NUMBER SEQUENCES USING THE FERMAT NUMBER TRANSFORM

RIGHTS OF THE GOVERNMENT

This invention may be manufactured, used, and/or sold by or for the United States Government for governmental purposes without the payment to me of any royalty thereon.

BACKGROUND OF THE INVENTION

1. Field of the Invention

This invention relates generally to antenna arrays and, more particularly, to beam-forming systems for such arrays. Even more particularly, the invention relates to a digital beam former capable of generating multiple output beams from an array of antenna elements. Applications for the invention include surveillance radar, instantaneous automatic direction finding, and adaptive arrays.

2. Description of the Prior Art

Techniques for performing a discrete cyclic convolution of two sequences of numbers are known. A definition for such a convolution is as follows:

$$Y_n = \sum_{k=0}^{k=N-1} x_k h_{n-k} \quad n = 0, 1, \ldots, N-1 \quad (1)$$

If computed directly, this convolution requires $N^2$ multiplications for two input sequences x and h, each of a length N. However, as is well known to those skilled in the art of digital signal processing, there exist arithmetic transforms having the cyclic convolution property, i.e., the transform of the cyclic convolution of two sequences is equal to the product of their transforms. Thus, if the two sequences x and h are transformed by a transform having the cyclic convolution property into two new sequences, it is necessary only to find the linear vector product of the transformed sequences (which requires only N multiplications) to produce the transform of the desired result. When this result is processed through an inverse transform operation, the final result is the desired output sequence, in this case y.

The most well known of such transforms is the Fast Fourier Transform (FFT) which is an algorithm for computing the discrete Fourier transform (DFT) of a sequence. Another such transform found useful in digital convolution is the Fermat Number Transform (FNT). The FNT and its application to digital signal processing are described, for example, in "Fast Convolution Using Fermat Number Transforms with Applications to Digital Filtering" by R. C. Agarwal and C. S. Burrus, *IEEE Transforms on Acoustics, Speech, and Signal Processing*, April, 1974, pages 87–97.

The discrete Fourier transform F(k) of a sequence x(n) may be defined as $$F(k) = \sum_{n=0}^{n=N-1} x(n)\exp(-2\pi jnk/N) \quad k = 0, 1, \ldots, N-1. \quad (2)$$

In contrast, the Fermat Number Transform F(k) of a sequence x(n) may be defined as $$F(k) = \sum_{n=0}^{n=N-1} x(n)\alpha^{nk}(\bmod F_t) \quad k = 0, 1, \ldots, N-1. \quad (3)$$

Equations (2) and (3) apply to sequences of length N, where N is an integral power of 2. In equation (3), $F_t$ is a Fermat number, defined as $F_t = 2^b + 1$, $b = 2^t$; and $\alpha$ is the Nth root of 1 (mod $F^t$), as will be discussed in greater detail below.

It is seen that the FNT resembles the DFT with $\alpha$ replacing $\exp(-2\pi j/N)$, and with all arithmetic performed modulo a Fermat number.

The significance of the FNT to digital signal processing lies in the fact that if $\alpha$ is an integral power of 2, multiplications by powers of $\alpha$ are accomplished by merely rotating bits in a register. In addition, the FFT algorithm may be used to compute the FNT as long as the length of the sequences is a power of two. Thus, the FNT can be implemented using only adders and bit shifters, with the only multiplications necessary being the linear vector product of the two transforms. The FFT algorithm is discussed, for example, in "What is the Fast Fourier Transform?" by W. T. Cochran et al, *IEEE Transactions on Audio and Electroacoustics*, June, 1967, at pages 45–55.

It is also quite common to design specialized hardware to perform Fermat arithmetic. Many such designs are based on novel digital coding schemes for the representation of numbers, such as described, for example, in "Hardware Realization of a Fermat Number Transform" by J. H. McClellan, *IEEE Transactions on Acoustics, Speech & Signal Processing*, June, 1976, pages 216–225, and in "Modified Circuits for Fermat Transform Implementation" by H. Nussbaumer, *IBM Technical Disclosure Bulletin*, October, 1976, pages 1720–1.

Electrical networks for forming multiple beams from linear antenna arrays have also been described in the literature. See, for example, "Multiple Beams from Linear Arrays", J. R. Shelton, *IRE Transactions on Antennas and propagation*, March, 1961, which describes the well known Butler matrix which forms multiple beams by utilizing passive analog networks of couplers and phase shifters.

Digital beam forming techniques using the FFT are also known. The Butler matrix is a hardwired analog FFT that produces, at its n output spigots, n antenna beams that are mutually orthogonal sinc functions; one for each of the n antenna elements. The difficulties of analog computation are preserved when hardware realization of a Butler matrix is attempted, thus many systems use the FFT to form antenna beams. In either case, the antenna beams generated have definite drawbacks unless some amplitude weighting function is applied to the antenna element outputs, and even such an adjustment avails little in beam improvement.

The FFT may be regarded conceptually as producing the cross-correlation of the antenna array and a circular function whose angular progression from point to point is related to the angle of arrival of the beam being formed. Since such a cross-correlation is a constant function of its variable, each output "spigot" represents this cross-correlation evaluated at a single point, and each "spigot" or output coefficient is due to a different angle of arrival, therefore due to a different (special) frequency circular function. Although the low quality beam patterns generated by the FFT can be used in linear combination (since they form a basis) to produce any realizable beam pattern or set of beam patterns, an additional computation load is thus generated whenever beam sharpening is required.

OBJECTS AND SUMMARY OF THE INVENTION

A general object of the present invention is to provide a novel, more efficient method of forming the complex linear vector product of two transformed sequences.

Another object of this invention is to provide a novel design for digital hardware capable of performing addition, subtraction, and multiplication modulo a Fermat number.

The foregoing and other objects are attained in accordance with one aspect of the present invention through the provision of apparatus for representing complex numbers of the form $A+jB$ in a computing system wherein all arithmetic is performed modulo a number of the form $2^b+1$. The apparatus comprises means for replacing the complex numbers by numbers of the form $A \pm 2^{b/2}B$.

In accordance with another aspect of the present invention, apparatus is provided for computing the complex linear vector product of two complex numbers represented by $C_i+jD_i$ and $E_i+jF_i$, $i=0, 1, \ldots, N-1$, comprising means for representing $C_i+jD_i$ as $C_i \pm 2^{b/2}D_i$, means for representing $E_i+jF_i$ as $E_i \pm 2^{b/2}F_i$, first means for computing the product of $C_i+2^{b/2}D_i$ and $E_i+2^{b/2}F_i$, and second means for computing the product of $C_i-2^{b/2}D_i$ and $E_i-2^{b/2}F_i$. Third means are provided for computing the sum of the output of the first means and the second means, and fourth means are provided for computing the difference between the output of the first means and the second means. Additionally, there are provided first means for dividing the output of the third means by two to form the real portion of the complex product, and second means for dividing the output of the fourth means by $2 \cdot 2^{b/2}$ to form the imaginary portion of the complex product. The two complex numbers are represented digitally and adhere to the formula $B=A-1$ if the decimal value of A is greater than or equal to 1, or $B=A+1$ if the decimal value of A is less than or equal to $-1$, wherein A denotes a one's complement binary number of p bits, and B denotes a binary number of $p+1$ bits wherein the $p+1$th bit equals 1 if the decimal value of A is zero.

In accordance with more specific aspects of the present invention, the first means for computing the product of the term $C_i+2^{b/2}D_i$ and $E_i+2^{b/2}F_i$ and the second means for computing the product of the term $C_i-2^{b/2}D_i$ and $E_i-2^{b/2}F_i$ comprises means for inverting the bits of those of the terms whose sign bit is zero, means for subtracting the more significant p bits of the two p bit products from the less significant p bits of the two p bit products and means for inverting the bits of the output of the means for subtracting which results from those terms of differing sign. The means for forming a 2p bit product preferably comprises a two's complement binary multiplier, while the means for subtracting includes means for performing the subtraction modulo a Fermat number.

In accordance with another aspect of the present invention, there is provided a technique for representing complex numbers of the form $A+jB$ in a computing system wherein all arithmetic is performed modulo a number of the form $2^b+1$, which comprises the step of replacing the complex numbers by numbers of the form $A \pm 2^{b/2}B$.

In accordance with yet another aspect of the present invention, a method is provided for computing the complex linear vector product of two complex numbers which are represented respectively by $C_i+jD_i$ and $E_i+jF_i$, $i=0, 1, \ldots, N-1$, comprising the steps of representing $C_i+jD_i$ as $C_i \pm 2^{b/2}D_i$, representing $E_i+jF_i$ as $E_i \pm 2^{b/2}F_i$, computing the first product of $C_i+2^{b/2}D_i$ and $E_i+2^{b/2}F_i$, and computing the second product of $C_i-2^{b/2}D_i$ and $E_i-2^{b/2}F_i$.

In accordance with more specific aspects of the present invention, the technique further comprises the steps of computing the sum of the result of the first product with the results of the second product, and computing the difference between the results of the first product and the results of the second product. Further, the sum is divided by two to form the real portion of the complex product, while the difference is divided by $2 \cdot 2^{b/2}$ to form the imaginary portion of the complex product.

In accordance with more specific aspects of the present invention, the step of computing the product of the term $C_i+2^{b/2}D_i$ and $E_i+2^{b/2}F_i$ and the step of computing the product of the term $C_i-2^{b/2}D_i$ and $E_i-2^{b/2}F_i$ comprises the steps of inverting the bits of those of the terms whose sign bit is zero, forming a 2p bit product of the p bit terms, subtracting the more significant p bits of the 2p bit product from the less significant p bits of the 2p bit product, and inverting the bits of the results of the step of subtracting, which results in those terms of differing sign. The step of subtracting preferably includes the step of performing the subtraction modulo a Fermat Number.

BRIEF DESCRIPTION OF THE DRAWINGS

Other objects, advantages, and features of this invention will become more apparent from the following detailed description of the present invention, when read in conjunction with the accompanying drawings, in which.

DETAILED DESCRIPTION OF THE PREFERRED EMBODIMENTS

A preferred embodiment of the present invention will now be described in connection with a circular, equispaced array of antenna elements, although it is understood that the present inventive technique and apparatus may be equally applicable to other array configurations and computation situations. For example, the array elements may be placed in non-circular (e.g., ellipitical) patterns, as long as they are equally angularly spaced about a point.

Figures 1, 2:
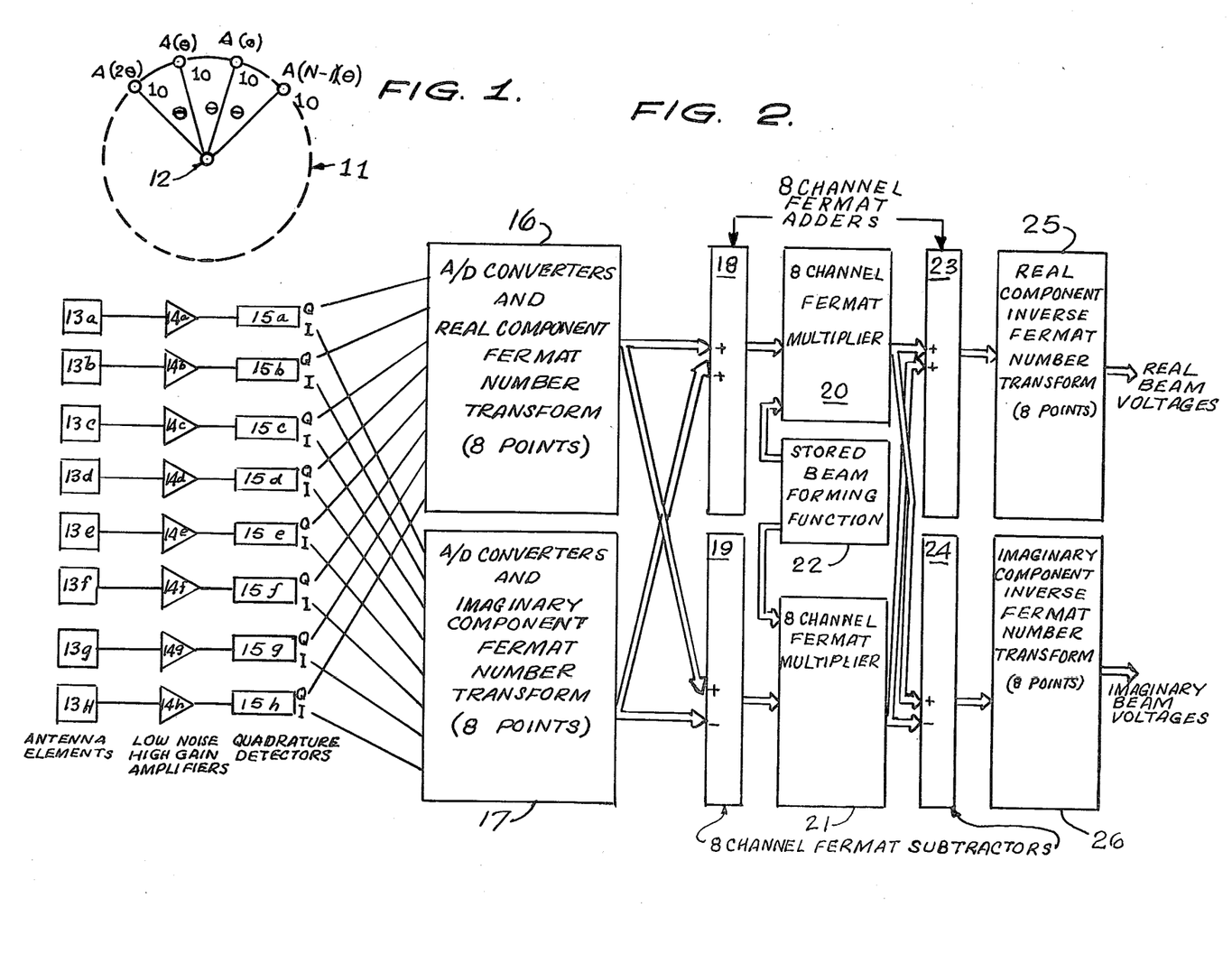
FIG. 1 is a diagram illustrating one possible placement of antenna elements in accordance with the present invention.
FIG. 2 is a block diagram of a preferred embodiment of this invention.

Referring now to FIG. 1, an array of N antenna elements 10 are located on a circle 11 which has its center at 12. The elements 10 are equally angularly separated by an angle $\theta$. The output signal from a given element is denoted by $A(k\theta)$, where $\theta$ is the angular spacing between adjacent elements and k ranges from 0 to $N-1$. Thus, for the elements shown, $A(0)$ is the output of the zeroeth element (k=0), $A(\theta)$ is the output of the first element (k=1), and $A((N-1)\theta)$ is the output of the $(N-1)$th element (k=N-1).

In order to produce a set of N simultaneous multiple beams from this array according to the method of this invention, the element outputs are convolved with a suitable beam forming function. That is, the function $A(k\theta)$, representing the array outputs, must be convolved with a beam-forming function $F(k\theta)$ to produce an output $B(k\phi)$ representing the desired output beams pointing in directions $k\phi$.

The discrete cyclic convolution of the two sequences $A(k\theta)$ and $F(k\theta)$ which must be evaluated can be written:

$$B(k\phi) = \sum_{k=0}^{k=N-1} A(k\phi)F(\phi - k\phi), \phi = 0, 1, \ldots, N-1.$$

One convenient procedure for computing the function $F(k\theta)$ according to the present invention involves the following steps:

1. Assume that a plane wave is exciting the antenna array from some direction $\psi$. Compute the outputs $A(k\theta)$ due to this plane wave;
2. Compute the Fermat Number Transform (FNT) of $A(k\theta)$ from Step 1;
3. Compute the inverse FNT of a desirable beam pattern $B(k\phi)$, peaking at $k\phi=\psi$; and
4. Form the linear vector product between the result of Step 3 and the multiplicative inverse of Step 2.

The result is the FNT of the desired beam forming function $F(k\theta)$, or at least a first approximation thereof. The beam pattern that results from application of the function $F(k\theta)$ must be investigated for its response between values of $k\theta$ that are achieved with integral k. The function $F(k\theta)$ as derived above will be referred to hereinafter as the "stored beam forming function". Note that it is the FNT of the stored beam forming function which is actually required for the convolution process.

Referring now to FIG. 2, a preferred embodiment of a beam forming system according to the present invention is shown in block form. The preferred embodiment utilizes, for the sake of explanation, eight antenna elements 13a-h which may be physically arranged as are the elements 10 of FIG. 1, or in any other suitable configuration. Although eight elements are illustrated, any number of elements which is a power of 2 can be used in accordance with a preferred mode of carrying out the present invention.

The outputs of the elements 13a-h are fed to respective amplifiers 14a-h whose preferably low-noise high-gain characteristics establish the overall noise figure for the system. The eight signals from amplifiers 14a-h are then fed to respective quadrature detectors 15a-h, of any conventional design, whose outputs provide a "real" and an "imaginary" component on respective channels Q and I for each array element.

Since the FNT is a real transform which operates only on real numbers, the Q and I channels from detectors 15a-h are transformed separately, the eight imaginary number channels I being treated as if they are real. Indicated by reference numeral 16 is a block representation of eight analog-to-digital (A/D) converters followed by an 8-point FNT for digitizing and then transforming the eight real channel components Q from the quadrature detectors 15a-h. Shown at 17 is a similar digitizer/Fermat Number Transform for processing the imaginary components I of the antenna voltages from the quadrature detectors 15a-h.

The sum and difference of the real and imaginary components are then formed in a Fermat adder 18 and a Fermat subtractor 19. The sum and difference process is part of a novel method of the present invention of forming the product of two complex vectors, and will be more fully described below. Bitshifters may be necessary to scale the quantities involved, and are not illustrated since, in the present hardwired pipeline convolution processor, the bit shifts may be accomplished by merely relabeling the outputs of a given register as its contents are passed to the next stage, as will be described in greater detail hereinafter.

Blocks 20 and 21 represent units which perform binary multiplication modulo a Fermat number. They operate to multiply the processed input from the array by the stored beam function $F(k\theta)$. The transformed beam function $F(k\theta)$ can reside in a read-only-memory (ROM) 22, or can simply be hardwired.

Fermat arithmetic units 23 and 24 also perform part of the novel technique of the present invention for forming a complex vector product. The outputs from units 23 and 24 are the real and imaginary components, respectively, of the transform of the desired output. Following conversion from the Fermat number domain to the time domain in inverse transform units 25 and 26, the beam voltages are ready to be utilized according to the desired application.

The object of the pipeline configuration set forth above is to be able to achieve an output that is as close to real time as possible (time for one pass through the processor must therefore be short) and to be able to update the outputs to reflect changes in the inputs (i.e., changes in the signals received by the antenna elements) as quickly as possible (the throughput rate of the processor must therefore be high). As is known in the art, a pipeline processor achieves both of these objectives by permitting data to enter the "pipe" before the previous block of data has exited. The hardware design of the present processor includes banks of latches to store intermediate results and prevent interference between one block of data and the next. Thus, many blocks of data can undergo processing simultaneously.

Figure 3A:
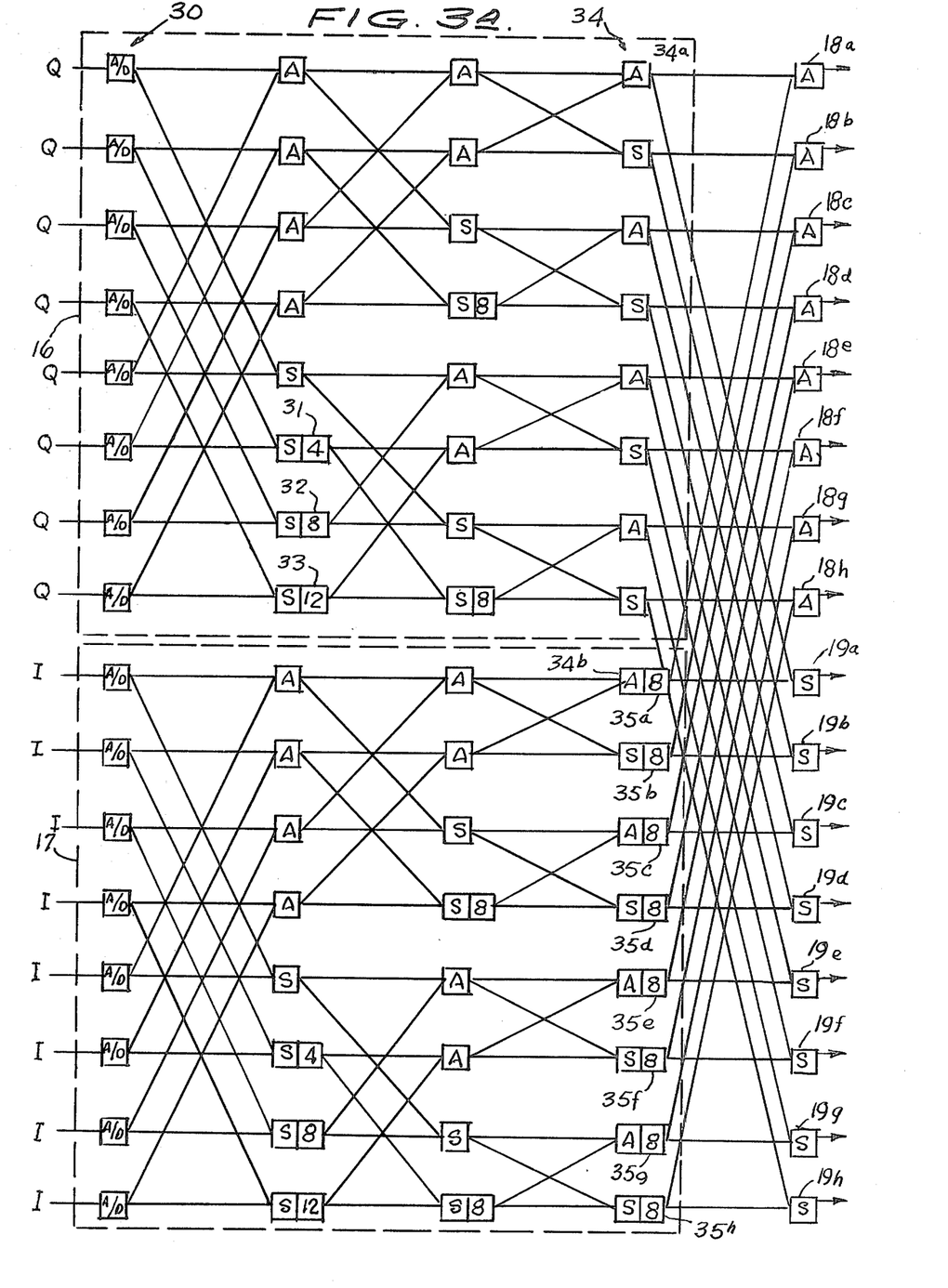
FIGS. 3A and 3B consist of a more detailed diagram of the components which comprise the preferred embodiment illustrated in FIG. 2.
Figure 3B:
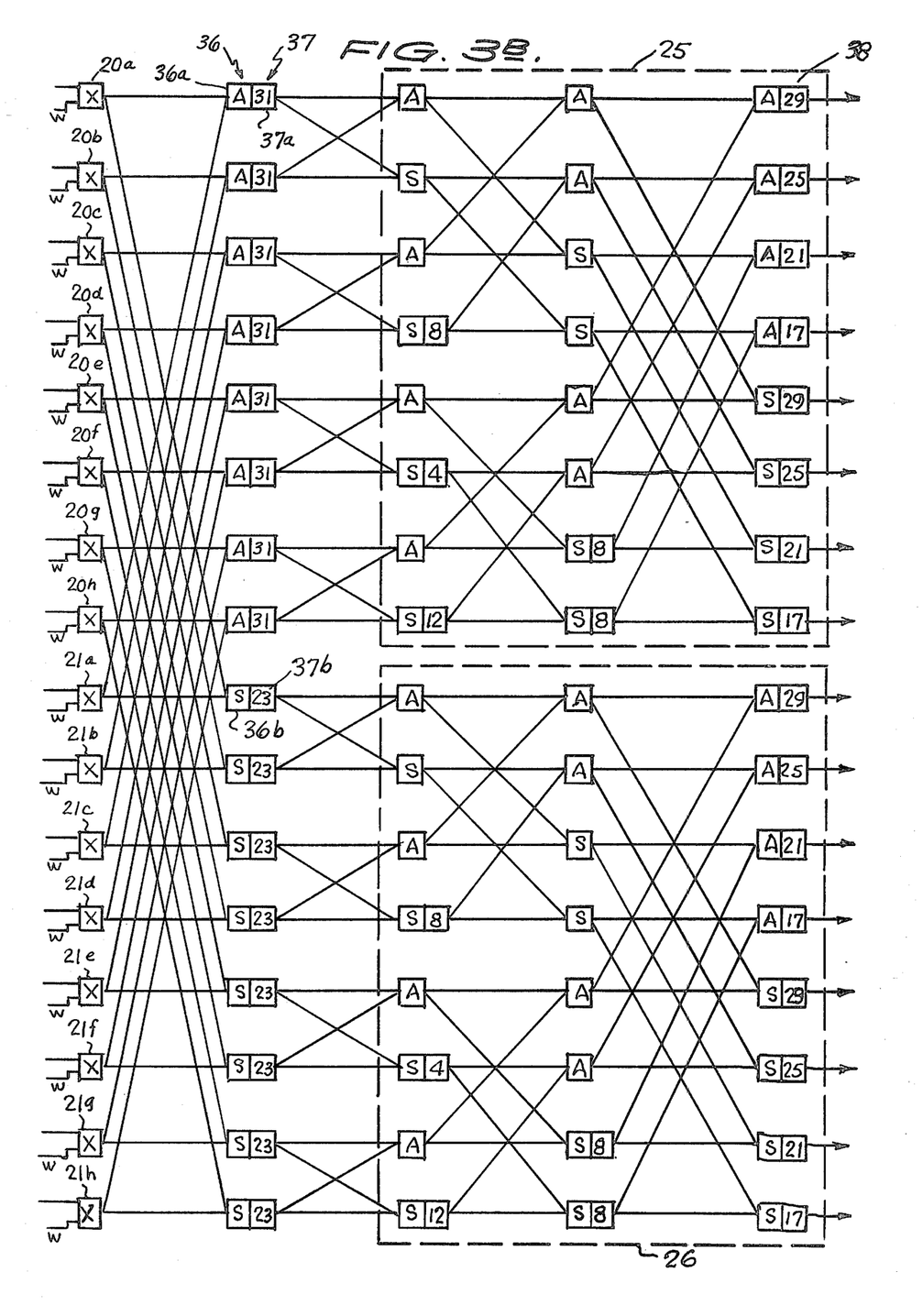

FIGS. 3A and 3B depict in greater detail a preferred implementation of the blocks 16 through 26 of FIG. 2. In FIGS. 3A and 3B, each box labeled A/D comprises a single analog-to-digital converter; each box labeled A comprises a 16-bit adder which adds modulo a Fermat number (hereinafter: "Fermat adder"); each box labeled S comprises a 16-bit subtractor which subtracts modulo a Fermat number (hereinafter: "Fermat subtractor"); each box containing a number represents an end around shift with inverted carry (hereinafter: "Fermat shift") by the number of bits indicated (recall that this is a matter only of relabeling the lines comprising a bus, not a true hardware shift); each box labeled X comprises a 16-bit Fermat multiplier while the inputs W to the multipliers X represent the terms of the beam forming function; and all buses, which are shown as single lines, comprise 17 bit data lines (16 data bits plus a zero flag bit).

Referring now to FIG. 3A, the Fermat adders 18a through 18h and Fermat subtractors 19a through 19h represent the 8-channel Fermat adder and subtractor 18 and 19, respectively, of FIG. 2. The remainder of FIG. 3A depicts the details of the data processors 16 and 17 of FIG. 2. As pointed out above, unit 16 receives the real components of the detected antenna signals, while unit 17 receives the imaginary components. The analog-to-digital converters are indicated in one column by reference numeral 30 of FIG. 3A.

The remainder of the circuitry of data processors 16 and 17 is very similar to the familiar FFT butterfly configuration for 8 data points and can be derived from that configuration, as will now be explained. A good explanation of the FFT algorithm, its derivation and its various forms is given in "What is the Fast Fourier Transform?" by W. T. Cochran et al, supra. In particular, FIG. 10 of that article depicts a signal flow graph for the decimation-in-frequency form of the FFT for 8 data points. Because the FFT algorithm can be used in computing the FNT, this signal flow graph is directly applicable to the present computation, as long as the difference between equations (2) and (3) above are kept in mind. (The Cochran article discusses the FFT algorithm only as it applies to computation of the DFT (discrete Fourier transform). Therefore, multiplications are by powers of $\alpha$ rather than by powers of $\exp(-2\pi j/N)$, and arithmetic is done modulo a Fermat number. Taking this into account, the FNT circuits of FIGS. 3A and 3B can be drawn directly from FIG. 10 of the above Cochran article once a value for $\alpha$ is determined.

As explained in the Agarwal article on the FNT, supra, $\alpha$ is determined according to which Fermat number is used and how many data points N are being convolved. In the present embodiment, for the sake of illustration, N is chosen to be 8. The determination of $F_t$ is based on overflow considerations. The dynamic range of an FNT is limited to $\pm(F_t-1)/2$. Thus for $F_2=17$, the range is $-8$ to $+8$, and 4-bit hardware can be used, as explained by Agarwal. A convenient Fermat number is $F_4=2^{16}+1=65537$, which allows a range of from $-32768$ to $+32768$ and requires 16-bit hardware. The availability of 4-bit arithmetic and logic units (ALU's) and 16-bit multipliers coupled with this maximum dynamic range makes $F=2^{16}+1$ an attractive choice for the design.

$\alpha$ may be determined from the following equation (taken from Agarwal):

$$\alpha^N = 1 \pmod{F_t} \tag{4}$$

For $N=8$ and $F_t=2^{16}+1$, $\alpha$ is 16, since $16^8=2^{32}=1 \pmod{2^{16}+1}$. The latter may be seen to be true as follows:

$$2^{32}-1=0 \pmod{2^{16}+1} \tag{5}$$

$$(2^{16}+1)(2^{16}-1)=0 \pmod{2^{16}+1} \tag{6}$$

Since $2^{16}+1$ divides the left side of equation (6) evenly, the equality is seen to be true. The transistion from equation (5) to equation (6) results from the equality $$(X+1)(X-1)=X^2-1 \tag{7}$$

where in this case $X=2^{16}$.

Knowing that $\alpha=16=2^4$, the transition from the Cochran FFT signal flow graph to FIG. 3A can be made. Where the term $\exp(-2\pi j/N)$ is raised to powers of 0, 1, 2, and 3, the FNT circuit will raise $2^4$ to powers of 0, 1, 2 and 3, resulting in factors of $2^0$, $2^4$, $2^8$, and $2^{12}$. This raising of 2 to powers of 4, 8 and 12 is seen, for example, in the boxes indicated by reference numerals 31, 32 and 33 in FIG. 3A. The pattern of add, subtract and shift follows the FFT in all respects, and is therefore not deemed needful of further explanation. The FNT circuits of units 16 and 17 in FIG. 3A are identical, and result in the formation at the outputs of the adders A and subtractors S, indicated generally by reference numeral 34, of the real and imagainary components of the antenna output signals.

Novel aspects of this portion of the present invention are believed to reside in the digital number system used to represent values throughout the processor, in the simplified design of the adders and subtractors, which will be explained below in conjunction with FIG. 4, and in the concept of transforming real and imagainary components separately using a real transform.

At this stage of the present inventive technique, the transform of a complex input sequence representing the antenna voltages has been computed and is present at the outputs of adder and subtractor column 34. The next step is to multiply the transformed sequence by the stored beam forming function. The transformed antenna voltages are of the form $C_i+jD_i$ where i ranges from 0 to 7. The term $C_0+jD_0$ could be formed from the output of adders 34a and 34b in FIG. 3A. The stored beam forming function is of the same complex form and can be represented by $E_i+jF_i$. The product which must be formed is $$\text{Product} = (C_i+jD_i)(E_i+jF_i). \tag{8}$$

This product is formed in a novel way according to the present invention as follows. Rather than compute equation (8) directly, which would require four multiplications and two additions, use is made of the modulus arithmetic aspect of the FNT to reduce the number of multiplications to two. Since $2^{16}+1=0 \pmod{F_t}$ in this system, $2^{16}=-1 \pmod{F_t}$ and $2^8=\sqrt{-1} \pmod{F_t}$. Thus $2^8$ behaves much as j, the square root of $-1$. (For the general case of $F_t=2^b+1$, $b=2^t$, the number which replaces j is $2^{b/2}$.) Equation (8) can then be written:

$$\text{Product} = (C_i+2^8D_i)(E_i+2^8F_i). \tag{9}$$

Expanding the right side of equation (9) yields:

$$(C_i+2^8D_i)(E_i+2^8F_i)=C_iE_i+2^{16}D_iF_i+2^8(C_iF_i+D_iE_i). \tag{10}$$

One can also form $(C_i-2^8D_i)$ and $(E_i-2^8F_i)$, whose product is:

$$(C_i-2^8D_i)(E_i-2^8F_i)=C_iE_i+2^{16}D_iF_i-2^8(C_iF_i+D_iE_i). \tag{11}$$

Taking the sum and difference of equations (10) and (11):

$$\text{Sum}=2(C_iE_i+2^{16}D_iF_i) \tag{12}$$

$$\text{Difference}=2\cdot 2^8(C_iF_i+D_iE_i) \tag{13}$$

Equation (12) can be rewritten:

$$\text{Sum} = 2(C_iE_i - D_iF_i) \tag{14}$$

since $2^{16} = -1 \pmod{F_t}$. The desired result may be provided by direct expansion of equation (9):

$$(C_i + jD_i)(E_i + jF_i) = (C_iE_i - D_iF_i) + j(D_iE_i + C_iF_i), \tag{15}$$

which is seen to be equal to the combination of the right side of equation (14), representing the real part of the answer, and the right side of equation (13), representing the imaginary part of the answer, as long as the factors of 2 in equation (14) and $2 \cdot 2^8$ in equation (13) are removed.

The implementation of the operations of equations (10), (11), (13), and (14) in the system of FIGS. 3A and 3B will now be exemplified for a single element $C_0 + jD_0$ of the transformed antenna voltages, it being clear that the remaining elements are treated similarly. As above, $C_0$ is the output of adder 34a and $D_0$ is the output of adder 34b. The term $C_0 + 2^8 D_0$ is formed in adder 18a, while the term $C_0 - 2^8 D_0$ is formed in subtractor 19a. The multiplication of $D_0$ by $2^8$ (which is done, as is all arithmetic in this processor, modulo $2^{16} + 1$), is shown by box 35a which represents a hard-wired Fermat shift of 8 bits, as will be explained more fully in conjunction with FIG. 6. Having formed $C_0 + 2^8 D_0$ and $C_0 - 2^8 D_0$, equations (10) and (11) are implemented in Fermat multipliers 20a and 21a in FIG. 3B. From the foregoing it is clear that the weight W forming the second input term to multiplier 20a must be equal to $E_0 + 2^8 F_0$, and the weight W forming the second input term to multiplier 21a must be equal to $E_0 - 2^8 F_0$. These weights W are developed from the discrete beam forming function $E_i + jF_i$, $i = 0, 1, \ldots, 7$. The output of multiplier 20a is equal to the right side of equation (10) and the output of multiplier 21a is equal to the right side of equation (11). The sums and differences represented by equations (13) and (14) are created by adders and subtractors indicated generally by reference numeral 36 in FIG. 3B. Thus, adder 36a forms the term $2(C_0E_0 - D_0F_0)$, representing the real portion of the product $(C_0 + jD_0)(E_0 + jF_0)$, while subtractor 36b forms the term $2 \cdot 2^8(C_0F_0 + D_0E_0)$, representing the imaginary portion of the desired product.

The shift units indicated generally by reference numeral 37 perform the necessary scaling to remove the factor of 2 from the real portions and the factor of $2 \cdot 2^8 = 2^9$ from the imaginary portions. Rather than divide (i.e., shift right) this scaling is depicted as a multiplication. Of course, since the process is only a relabeling of lines, it could be thought of either way. Because $2^{32} = 1 \pmod{F_t}$ for this system, in which $F_t = 2^{16} + 1$, a multiplication by $2^{31} \pmod{F_t}$ is equivalent to division by 2. Similarly, a multiplication by $2^{23} \pmod{F_t}$ is equivalent to division by $2^9 \pmod{F_t}$. Therefore, the scaling of the output of adder 36a is performed by the 31-bit shift of box 37a, and the scaling of the output of subtractor 36b is performed by the 23-bit shift of box 37b. Now the entire product has been formed, using only the two multipliers 20a and 21a, rather than the four multipliers which would be required were the product formed directly.

The remainder of FIG. 3B depicts the details of boxes 25 and 26 of FIG. 2. The circuits of boxes 25 and 26 are identical; one computes the inverse transform for the real portion of the product of the transformed input signals and the stored function, while the other handles the imaginary portion. In determining the pattern for these inverse transform circuits, the FFT algorithm is again directly applicable. The differences between the inverse FNT and the inverse DFT are the same as the differences between the FNT and the DFT. This can be appreciated from a comparison of the definitions of these inverse transforms. The inverse DFT is $$x(n) = (1/N) \sum_{k=0}^{k=N-1} F(k)\exp(2\pi jnk/N) \quad n = 0, 1, \ldots, N-1 \tag{16}$$

and the inverse FNT is $$x(n) = (1/N) \sum_{k=0}^{k=N-1} F(k)\alpha^{-nk}(\text{mod } F_t) \quad n = 0, 1, \ldots, N-1. \tag{17}$$

It may be seen from a comparison of equation (17) with equation (3) that the only differences between the FNT and the inverse FNT are a factor of $1/N$ and a change of sign in the exponents of $\alpha$. Thus, the same FFT signal flow graph can be used for the inverse FNT as was used for the FNT. However, as explained in the Cochran FFT article, supra, the form of FFT used in FIG. 3A causes the transformed sequence to emerge in shuffled order, so that if the input sequence is $X_0$ through $X_7$, the output will be in the order of $F_0$, $F_4$, $F_2$, $F_6$, $F_1$, $F_5$, $F_3$, $F_7$. Therefore, the form of FFT used for the inverse transform must accept such a shuffled sequence and re-sort it back to the original order. The circuits 25 and 26 of FIG. 3B are thus equivalent to the circuits 16 and 17 of FIG. 3A, except for a rearrangement of nodes which is necessary to accomplish the reordering. The circuits of FIG. 3B correspond to FIG. 11 of the Cochran article, the latter being merely a rearrangement of his FIG. 10 which was discussed above in connection with the present FIG. 3A. The boxes indicated generally by reference numeral 38 perform the necessary corrections to satisfy the differences between equations (17) and (3), including dividing by $N = 8$, which can be thought of as a 3-bit Fermat shift to the right, or a 29-bit shift to the left, as discussed above.

Figure 4:
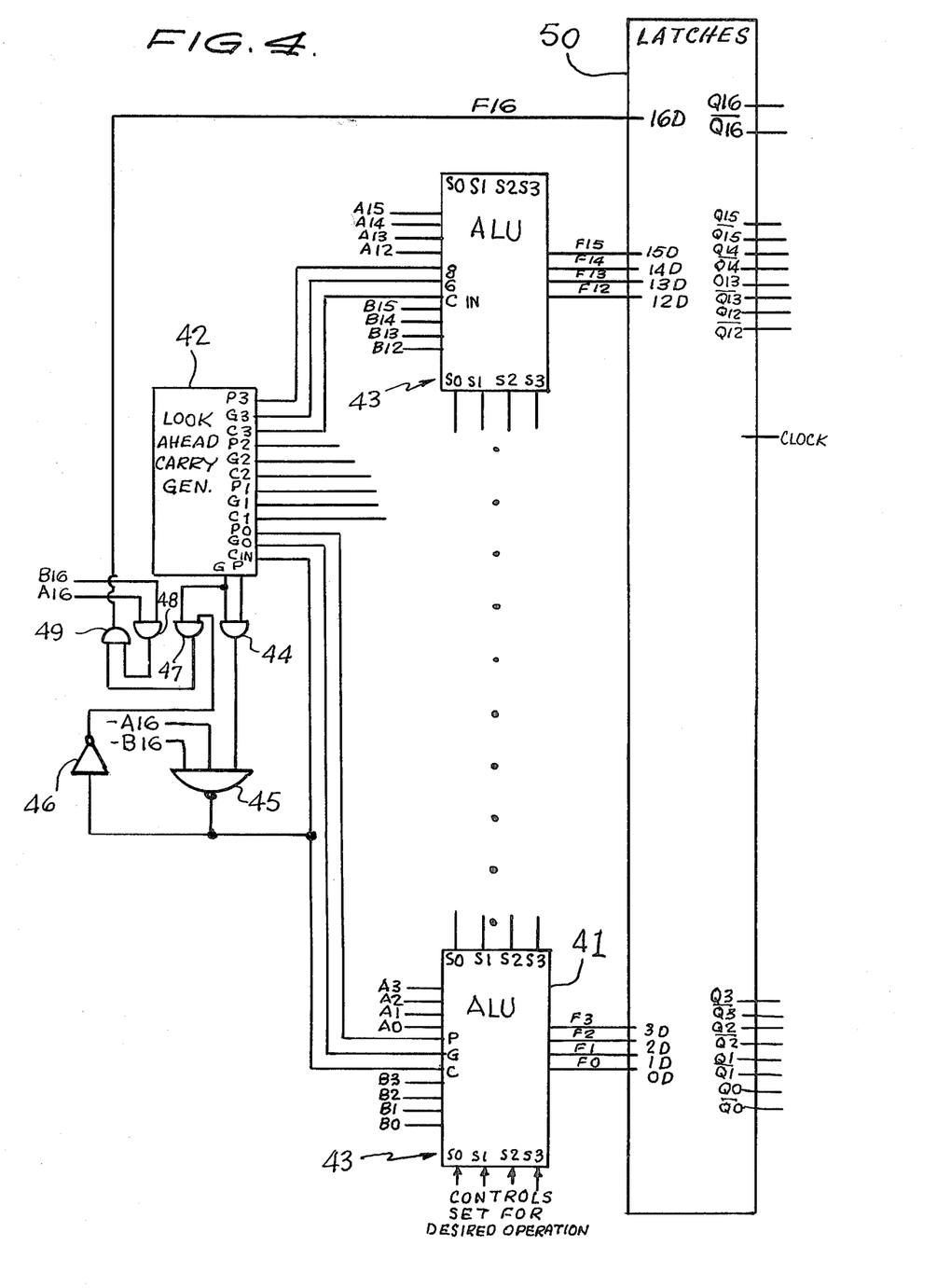
FIG. 4 is a schematic diagram illustrating a preferred embodiment of the adders and subtractors of the system shown in FIGS. 3A and 3B.
Figure 5:
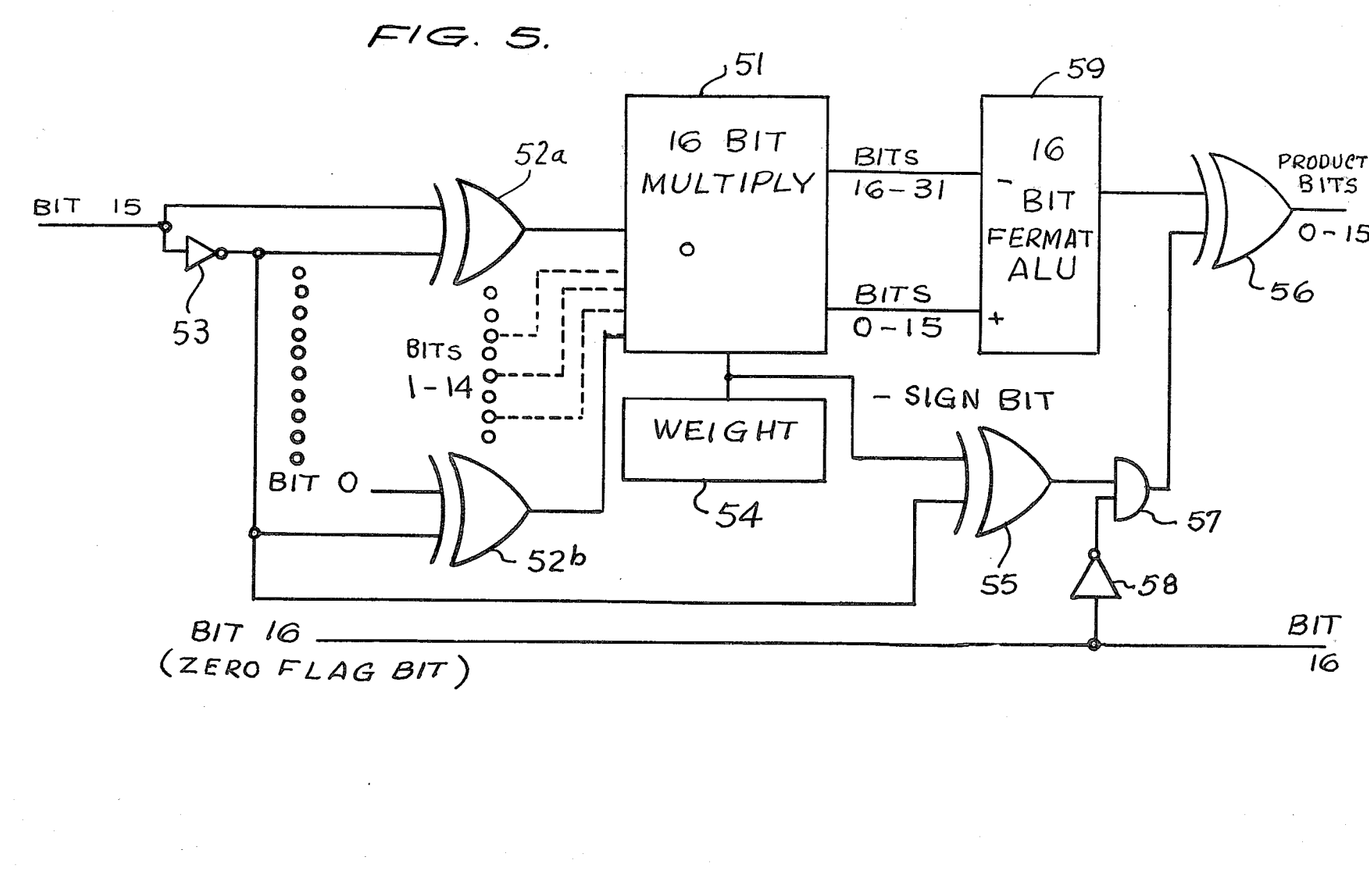
FIG. 5 is a schematic diagram which shows a preferred design of the multipliers of the system of FIG. 3B.
Figure 6:
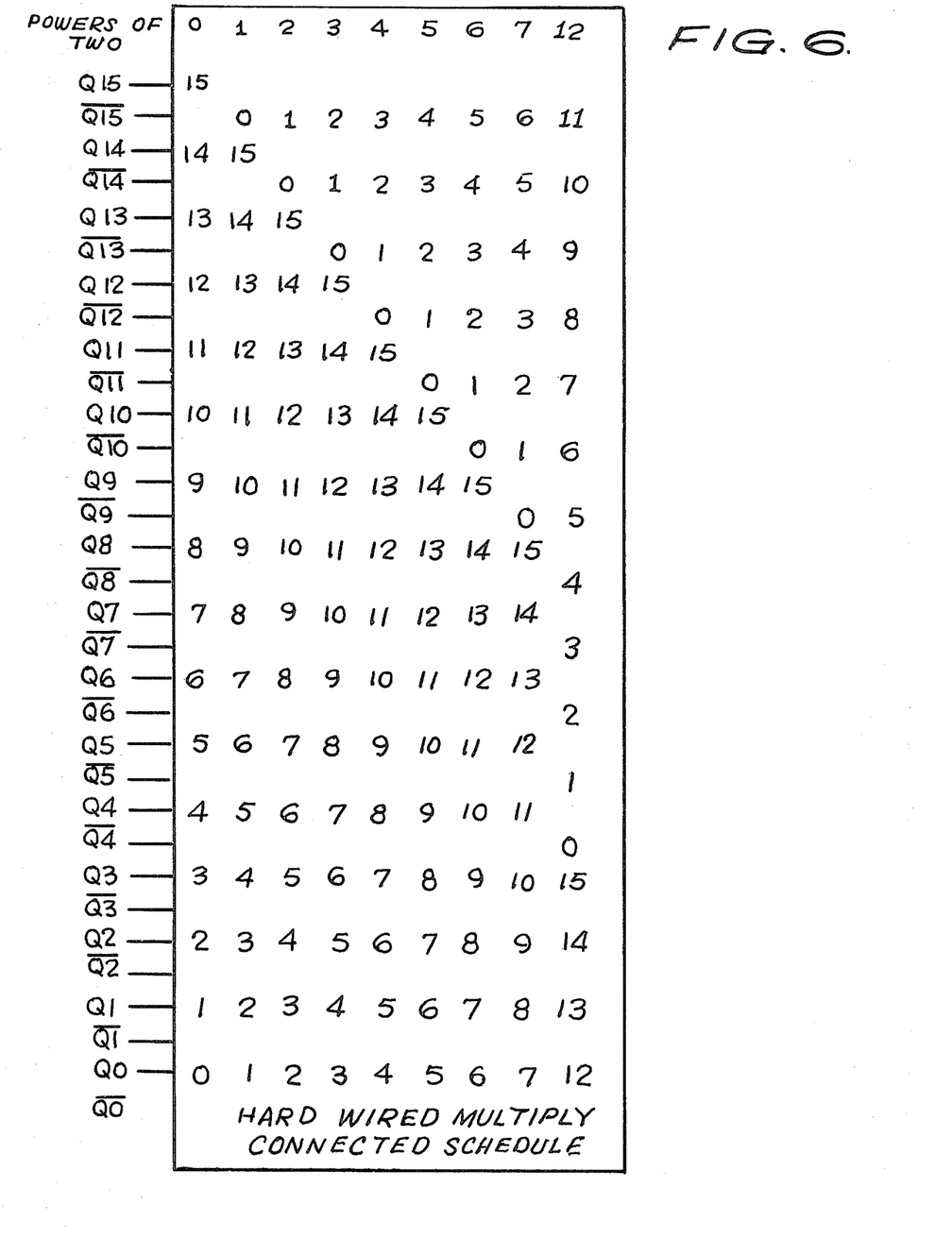
FIG. 6 is a table helpful in understanding the structure and function of the scalers of FIGS. 3A and 3B.

FIGS. 4, 5 and 6 show the manner in which readily available hardware may be utilized to implement the system of FIGS. 3A and 3B. Due to the availability of TTL-compatible 16-bit multiply chips, such as those manufactured by TRW, Inc., TTL is the logic family chosen for the hardware implementation illustrated. One objective in designing the Fermat hardware is to minimize the amount of logic as much as possible. This object is achieved in the present invention through the use of a special digital number system which allows standard 1's complement ALU's to perform arithmetic modulo $2^{16} + 1$. Another object in the hardware design is to eliminate as many multiplications as possible. This is achieved through the use of the FNT to perform the desired convolution and by the special method for forming a complex linear vector product given above. The latter reduces by a factor of 2 the number of multiplications required to be performed, albeit at the cost of increased additions and subtractions. However, this is a desirable tradeoff from the standpoint of cost since presently available 16-bit LSI multiplier chips are very expensive compared to adders and subtractors.

An explanation of the special numbering system of the present invention shall now be set forth for the case of four bit hardware, corresponding to $F_2=2^4+1=17$, it being understood that the following explanation is equally valid for other Fermat numbers. The object is to design an ALU which can add modulo 17. A four bit ALU can handle numbers from $-7$ to $+7$ if the most significant bit (MSB) is reserved for use as a sign bit. This is the well known one's complement representation of numbers and is illustrated in the following table:

| Decimal Value | Binary Representation |
|---|---|
| +7 | 0111 |
| +6 | 0110 |
| +5 | 0101 |
| +4 | 0100 |
| +3 | 0011 |
| +2 | 0010 |
| +1 | 0001 |
| +0 | 0000 |
| -0 | 1111 |
| -1 | 1110 |
| -2 | 1101 |
| -3 | 1100 |
| -4 | 1011 |
| -5 | 1010 |
| -6 | 1001 |
| -7 | 1000 |

To perform arithmetic modulo some other number, all results must stay within the range of $-7$ to $+7$. One way to do this is to add any carry bits generated into the least significant bit (LSB) of the result as follows:

```
    4     0100        -5     1010
   +5     0101        -6     1001
          1001               0011
No Carry   0       Carry      1
  (-6)    1001       (4)     0100
```

These examples show that the 4-bit ALU with carry added to the LSB performs arithmetic modulo 15. Similarly, a p-bit ALU with carry added to LSB would perform arithmetic modulo $2^p-1$.

To enable the ALU to operate modulo $2^p+1$, the following interpretation of the binary bits of a 4-bit ALU is provided by the present invention:

| New Interpretation | Binary Representation |
|---|---|
| +8 | 0111 |
| +7 | 0110 |
| +6 | 0101 |
| +5 | 0100 |
| +4 | 0011 |
| +3 | 0010 |
| +2 | 0001 |
| +1 | 0000 |
| -1 | 1111 |
| -2 | 1110 |
| -3 | 1101 |
| -4 | 1100 |
| -5 | 1011 |
| -6 | 1010 |
| -7 | 1001 |
| -8 | 1000 |

Zero is represented by adding a fifth bit which, when equal to one, denotes that the number represented is zero. The following examples show that an ALU with carry inverted and added to the LSB operates modulo 17 with this number system:

```
   2        0001
  +4        0011
   6        0100
             1      Inverted carry added to LSB
            0101    = 6

4        0011
  +5        0100
   9        0111
             1      inverted carry added to LSB
            1000    = -8 = 9 mod 17

-5        1011
  -6        1010
 -11        0101
             0      inverted carry added to LSB
            0101    = 6 = -11 mod 17
```

Thus a 4-bit ALU with the carry-out signal inverted and added to the LSB of the result performs arithmetic modulo 17 when binary numbers are interpreted according to the special system of the present invention. Similarly, a p-bit ALU with inverted carry added to LSB performs arithmetic modulo $2^p+1$ using the special number system.

Multiplication by powers of 2 is accomplished by shifting left with inverted end around carry. The following example illustrates:

$$6\times 2^3=6\times 8=48=-3 \bmod 17$$

```
  6 =   0101
        1011 after one shift
        0110 after two shifts
 -3 =   1101 after three shifts.
```

Thus multiplication by $2^3$ simply requires 3 left shifts with bits shifted out of the most significant bit (MSB) being inverted and entered into the vacated LSB.

Of course, getting into, and out of, this new number system requires some sort of conversion. This conversion is a simple operation whose details depend on the starting and final number systems to be used. More particularly, the digital representation of all numbers adheres to the formula $B=A-1$ if the decimal value of A is greater than or equal to 1, or $B=A+1$ if the decimal value of A is less than or equal to $-1$, wherein A denotes a one's complement binary number of p bits, and B denotes a binary number of $p+1$ bits wherein the $(p+1)$th bit equals 1 if the decimal value of A is zero. Note in particular that the representation of negative numbers in this system is identical to the representation of negative numbers in the well known two's complement binary system. In implementing the convolution processor of this invention, the initial conversion into the special number system could be performed automatically by, for example, using analog-to-digital converters designed to convert directly to the new system.

Referring now to FIG. 4, one preferred design for a 16-bit ALU using the new number system is shown. The design includes four 4-bit Schottky TTL ALUs, which may be, for example, of the type known as 74S181 manufactured by Signetics. Two such ALUs 40 and 41 are illustrated, although it is understood that a total of four such units are utilized in the embodiment of FIG. 4. The individual ALUs are commonly fed by a Look Ahead Carry Generator (e.g., Signetics type 74S182), designated by reference numeral 42 in FIG. 4. These devices are interconnected in a known fashion to produce a 16-bit ALU. The control lines S0, S1, S2 and S3, designated generally by numeral 43, are set to LHHL if a subtractor is desired, or to HLLH if addition is desired. The two 16-bit inputs to the ALU are denoted $A_0$ through $A_{15}$ and $B_0$ through $B_{15}$, respectively. The 16-bit output is denoted $F_0$ through $F_{15}$, and is wired to a set of D-type latches denoted by reference numeral 50. The zero flag bit of each input is $A_{16}$ and $B_{16}$, and the zero flag bit of the result is $F_{16}$, which is also latched. The latches 50 may comprise, for example, 74174 or 74175 type TTL circuits. The 74174 provides six D latches with only the non-inverted output available. The 74175 provides four D latches with both output polarities available. Which type is selected for use would depend, inter alia, upon whether the inverted outputs of a particular adder or subtractor in FIGS. 3A and 3B are required. For example, those units followed by a scaler block will need inverted outputs available on at least some bits, since the scaling process involves an inverted end-around shift. All latches for a given ALU are clocked together as soon as the ALU outputs are valid, and are not reclocked until the next block of data passes into the ALU from the latches of the previous ALU and the new result is determined to be valid. The clock signals may be provided by a conventional control system (not shown) for the processor.

The present invention modifies the standard TTL 16-bit ALU thus far described by providing the logic gates 44, 45, 46, 47, 48 and 49. The latter elements cause the ALU to add an inverted carry from the look ahead carry generator 42 to the LSB of the ALU, and additionally generate the correct zero flag bit F16 of the ALU output. More particularly, the ALU must have the carry-in input equal to the complement of the carry-out in order to perform as defined above. Thus, if A plus B generates an overflow, then there should be no carry-in to the low order ALU 41 or to the look ahead carry chip 42. If A plus B generates no overflow, then a carry-in is desired to ALU 41 and look ahead carry chip 42. The carry-out signal is a function of the generate (G) and propagate (P) outputs of chip 42, where G indicates that the addition of A and B has generated a carry, and P indicates that the state of the ALU after computing A plus B is such that a carry-in would propagate through the ALU to produce a carry-out. The latter is important in determining whether a zero result has occurred, for the only way a zero sum can be obtained is by propagation of a carry through all four ALUs. I have determined that for the 74S182 chip, the true "propagate" condition is given by $$\text{Propagate} = G\overline{P} \quad (18)$$

while the true "generate" condition is given $$\text{Generate} = GP. \quad (19)$$

The carry-in signal is a down-level active signal. Since carry-in should be generated whenever there is *not* a carry-out generated (except that no carry should be generated if either input is zero (i.e., if $A_{16}=1$ or $B_{16}=1$)), the proper Boolean expression for the carry-in is $$\text{Carry-In} = A_{16} + B_{16} + (G \cdot P) \quad (20)$$

which can be written as $$\text{Carry-In} = \overline{A_{16}} \cdot \overline{B_{16}} \cdot \overline{GP} \ . \quad (21)$$

NAND gate 44 forms $\overline{GP}$, and NAND gate 45 forms the carry-in signal which is fed to the lower-order ALU 41 at C and to the carry-in input C in of the look ahead carry chip 42.

The output of line $F_{16}$ of the ALU represents a zero result, which can occur either as the result of a "propagate", or as a result of both inputs being zero. Thus the Boolean expression for $F_{16}$ is $$F_{16} = A_{16} \cdot B_{16} + \overline{GP} \quad (22)$$

or $$F_{16} = A_{16} \cdot B_{16} + G \cdot \overline{\text{Carry-In}} \quad (23)$$

which is implemented by NAND gates 47, 48, 49 and inverter 46.

FIG. 5 is a detailed schematic of one of the multipliers represented by the boxes labeled X in FIGS. 3A and 3B. The multiplier illustrated in FIG. 5 must accept two 16-bit inputs and compute their product modulo a Fermat number. This is accomplished in accordance with the present invention by using commercially available two's complement multipliers as follows:

(a) The negative numbers of the special number system are identical to the two's complement interpretation of these numbers. Therefore, to enter the multiplier with proper magnitudes all non-negative inputs are converted by inverting their bits.

This conditional inversion of bits is performed by sixteen exclusive OR gates, only two of which 52a and 52b are illustrated for the sake of simplicity. If bit 15 of the input term is zero, indicating a positive input, then inverter 53 causes the sixteen exclusive OR gates to invert the incoming bits. If the incoming term is negative, it passes the exclusive OR gates unchanged. The weight or stored beam function term 54, which may be stored in, for example, a ROM or simple hardwiring, is connected to the other input of multiplier 51. If it is positive, it is complemented before being stored (or hardwired). The sign bit of the weight 54 is exclusive-OR'ed with the sign bit of the input term in gate 55 to determine the correct output polarity of the product. If the product needs to be inverted, this takes place in a bank of sixteen exclusive OR gates represented by reference numeral 56. Note that this process is inhibited, by means of AND gate 57 and inverter 58, if the zero flag bit of the input term is on.

(b) The product from the multiplier will be a positive two's complement number. In order to reconvert this to the number system used in the present invention, an LSB must be subtracted to achieve the proper magnitude. The circuit of FIG. 5 does this automatically. A 16-bit signed two's complement multiplier will produce a 30-bit product, with the 31st bit serving as sign bit. To reduce such products modulo $2^{16}+1$, they are broken up into two 16-bit numbers, both necessarily less than $2^{16}+1$, and the product P is represented as:

$$P = U \times 2^{16} + L \tag{24}$$

where L is the number in the 16 less significant bits and U is a 16-bit number obtained by extending the upper 15 bits to the left. Now because $2^{16} = -1 \pmod{2^{16}+1}$, $$U \times 2^{16} = -U \pmod{2^{16}+1} \tag{25}$$

and $$P = L - U \pmod{2^{16}+1}. \tag{26}$$

Both L and U are two's complement numbers. Thus, the indicated subtraction, were a two's complement result desired, would be performed by adding the two's complement of U to L. The two's complement of U would be obtained by inverting the bits of U, then adding an LSB. Summing this complement with L would then produce a two's complement answer that, once again, would require subtraction of an LSB to make its direct interpretation as a number (adhering to the special number system of this invention) have the proper magnitude. If the second step (adding an LSB) is deleted in the formation of the two's complement of U, then the proper magnitude is automatically obtained.

The addition of the inverted bits of U to L is done by a Fermat subtractor 59, which operates modulo $2^{16}+1$ using inverted end around carry as described above. Application of U to the subtracting input is equivalent to inverting U and adding.

FIG. 6 is a table showing how the output lines of a given ALU may be relabeled if the output is to be scaled. This scaling is represented in FIGS. 3A and 3B by a box containing a decimal numeral. The numeral represents the power of 2 which is to be multiplied by the ALU output. As mentioned earlier, this multiplication, which in a general purpose computer would be accomplished by rotating bits in a register, is accomplished in this special-purpose processor by hardwiring. In other words, the bits are merely relabeled. Additionally, the shift must be done modulo a Fermat number. This is accomplished according to the present invention by merely inverting the carry-out bit of an end around shift before the bit is reentered into the LSB of the register. The special number system used herein allows this simple implementation. An example is given above in the discussion of the number system.

FIG. 6 depicts how the relabeling may be accomplished. At the left side of the table is shown the latched outputs of an ALU, with both polarities of all signals being available. The power of two which is to be the multiplier is shown across the top of the table. The proper relabeling for a given power of two is determined by the column of numerals immediately below the desired power of two. Thus, for multiplication by $2^1$, which is a one bit shift, Q15 of the input is not used. Rather, $\overline{Q15}$ becomes the new bit 0. Q14 becomes new bit 15, Q13 becomes new bit 14, and so on. Note that the inversion of Q15 and relabeling as bit zero is due to the inverted end-around carry coupled with the one bit shift to the left. The technique for other powers of two is similar. For the sake of simplicity, the entries for powers of two between 8 and 11 and for 13 and above are not shown. These can be determined quite easily by extending the table of FIG. 6 to the right.

The description of the preferred embodiment of the present invention is now complete. The pipeline processor described above is capable of a throughput rate of roughly one convolution every 200 nanoseconds, the limiting factor being the time required by the 16-bit multiplier chip. If such a high throughput rate is not required in a given application, the transform hardware can be time-shared using well known techniques, thereby reducing the amount of logic required. For example, the real FNT and imaginary FNT could be performed serially by the same transform circuit. Also, because the FNT circuit and the inverse FNT circuit are actually equivalent, having only been redrawn to compensate for the reordering of terms in the sequences as discussed above, a single FNT circuit could perform both the FNT and inverse FNT for both real and imaginary portions. Time sharing schemes for reducing the number of individual ALUs within a given FNT circuit can also be designed. Noting that each bank of latches feeds two ALUs, one to form a sum and the other to form a difference, it may be appreciated that if the ALUs to form the differences are eliminated, the remaining ALUs can first form the sums, to be latched into the sum registers, then form the differences to be latched into the difference registers.

Obviously, numerous modifications and variations of the present invention are possible in light of the above teachings. It is therefore to be understood that within the scope of the appended claims, the invention may be practiced otherwise than as specifically described herein.

I claim as my invention:

1. In combination with a computing system wherein all arithmetic is performed modulo a number of the form $2^b + 1$, wherein $b = 2^n$ and n is an integer, apparatus for representing complex numbers of the form $A + jB$ comprising means for replacing said complex numbers by numbers of the form $A \pm 2^{b/2}B$.

2. In a computing system wherein all arithmetic is performed modulo a number of the form $2^b + 1$, wherein $b = 2^n$ and n is an integer, apparatus for computing the complex linear vector product of two sequences of complex numbers each of a length N and represented respectively by $C_i + jD_i$ and $E_i + jF_i$, $i = 0, 1, \ldots, N-1$, comprising:

means for representing $C_i + jD_i$ as $C_i \pm 2^{b/2}D_i$;
   means for representing $E_i + jF_i$ as $E_i \pm 2^{b/2}F_i$.
   first means for computing the product of input terms $C_i + 2^{b/2}D_i$ and $E_i + 2^{b/2}F_i$; and
   second means for computing the product of terms $C_i - 2^{b/2}D_i$ and $E_i - 2^{b/2}F_i$.

3. The computing apparatus as set forth in claim 2, further comprising:

third means for computing the sum of the output of said first means and said second means; and
   fourth means for computing the difference between the output of said first means and said second means.

4. The computing apparatus as set forth in claim 3, further comprising:

first means for dividing the output of said third means by 2 to form the real portion of said complex product; and
   second means for dividing the output of said fourth means by $2 \cdot 2^{b/2}$ to form the imaginary portion of said complex product.

5. The computing apparatus as set forth in claim 4, wherein said two sequences of complex numbers adhere to the following:

Let X = a digital binary number of p bits (X = any of C, D, E or F); and $X'=$ a converted form of X and a digital binary number of (p+1) bits;

Then (1) If the decimal value of $X=0$, the (p+1)th bit of $X'=1$;

(2) If the decimal value of $X \geq 1$, the least significant p bits of $X'=X-1$; and (3) If the decimal value of $X \leq -1$, the least significant p bits of $X'=X+1$.

6. The computing apparatus as set forth in claim 5, wherein said first means for computing the product of said input terms $C_i+2^{b/2}D_i$ and $E_i+2^{b/2}F_i$ each having p bits and said second means for computing the product of said terms $C_i-2^{b/2}D_i$ and $E_i-2^{b/2}F_i$ each having p bits comprises:

means for inverting the bits of those of said terms whose sign bit is zero;

means for forming a 2p bit product of the p bit input terms;

means for subtracting the more significant p bits of said 2p bit product from the less significant p bits of said 2p bit product; and means for inverting the bits of the output of said means for subtracting which results from said input terms of differing sign.

7. The computing apparatus as set forth in claim 6, wherein said means for forming a 2p bit product comprises a two's complement binary multiplier.

8. The computing apparatus as set forth in claim 6, wherein said means for subtracting includes means for performing the subtraction modulo a Fermat number.

9. In a computing system wherein all arithmetic is performed modulo a number of the form $2^b+1$, wherein $b=2^n$ and n is an integer, a technique for representing complex numbers of the form $A+jB$ comprising the step of replacing said complex numbers by numbers of the form $A \pm 2^{b/2}B$.

10. In a computing system wherein all arithmetic is performed modulo a number of the form $2^b+1$, wherein $b=2^n$ and n is an integer, a method for computing the complex linear vector product of two sequences of complex numbers each of a length N and represented respectively by $C_i+jD_i$ and $E_i+jF_i$, $i=0, 1, \ldots, N-1$, comprising the steps of:

a. representing $C_i+jD_i$ as $C_i \pm 2^{b/2}D_i$;

b. representing $E_i+jF_i$ as $E_i \pm 2^{b/2}F_i$;

c. computing the product of input terms $C_i+2^{b/2}D_i$ and $E_i+2^{b/2}F_i$; and d. computing the product of terms $C_i-2^{b/2}D_i$ and $E_i-2^{b/2}F_i$.

11. The computing method as set forth in claim 10, further comprising the steps of:

e. computing the sum of the result of step (c) and the result of step (d); and f. computing the difference between the result of step (c) and the result of step (d).

12. The computing method as set forth in claim 11, further comprising the steps of:

g. dividing the result of step (e) by 2 to form the real portion of said complex product; and h. dividing the result of step (f) by $2 \cdot 2^{b/2}$ to form the imaginary portion of said complex product.

13. The computing method as set forth in claim 12, wherein said two sequences of complex numbers adhere to the following:

Let $X=$ a digital binary number of p bits ($X=$ any of C, D, E or F); and $X'=$ a converted form of X and a digital binary number of (p+1) bits;

Then (1) If the decimal value of $X=0$, the (p+1)th bit of $X'=1$;

(2) If the decimal value of $X \geq 1$, the least significant p bits of $X'=X-1$; and (3) If the decimal value of $X \leq -1$, the least significant p bits of $X'=X+1$.

14. The computing method as set forth in claim 13, wherein said step of computing the product of said input terms $C_i+2^{b/2}D_i$ and $E_i+2^{b/2}F_i$ each having p bits and said step of computing the product of said terms $C_i-2^{b/2}D_i$ and $E_i-2^{b/2}F_i$ each having p bits comprises the steps of:

inverting the bits of those of said terms whose sign bit is zero;

forming a 2p bit product of the p bit input terms;

subtracting the more significant p bits of said 2p bit product from the less significant p bits of said 2p bit product; and inverting the bits of the result of said step of subtracting, which results from said input terms of differing sign.

15. The computing method as set forth in claim 14, wherein said step of subtracting includes the step of performing the subtraction modulo a Fermat number.

* * * * *